United States Patent [19]
Ishikawa et al.

[11] Patent Number: 6,058,142
[45] Date of Patent: May 2, 2000

[54] IMAGE PROCESSING APPARATUS

[75] Inventors: Toshiro Ishikawa, Tokyo; Yukio Yanagida, Kanagawa, both of Japan

[73] Assignee: Sony Corporation, Tokyo, Japan

[21] Appl. No.: 08/979,789

[22] Filed: Nov. 26, 1997

[30] Foreign Application Priority Data

Nov. 29, 1996 [JP] Japan ................................ 8-319899
Nov. 29, 1996 [JP] Japan ................................ 8-319900

[51] Int. Cl.[7] .............................. H04N 5/14; H04N 9/64; H04N 7/12
[52] U.S. Cl. .................... 375/240; 375/240.16; 348/699; 348/416
[58] Field of Search .................................... 348/402, 413, 348/416, 420, 699; H04N 5/14, 7/36, 9/64

[56] References Cited

U.S. PATENT DOCUMENTS

| 5,400,087 | 3/1995 | Uramoto et al. | 348/699 |
|---|---|---|---|
| 5,585,862 | 12/1996 | Wuertele et al. | 348/699 |
| 5,619,268 | 4/1997 | Kobayashi et al. | 348/416 |
| 5,715,016 | 2/1998 | Kobayashi et al. | 348/699 |

FOREIGN PATENT DOCUMENTS

| 2 214 751 | 9/1989 | United Kingdom . |
|---|---|---|
| 2 229 603 | 9/1990 | United Kingdom . |
| WO 93/25972 | 12/1993 | WIPO . |

*Primary Examiner*—Howard Britton
*Assistant Examiner*—Nhon T Diep
*Attorney, Agent, or Firm*—Ronald P. Kananen; Rader, Fishman & Grauer

[57] ABSTRACT

An image processing apparatus, wherein image data is stored in a current block memory and image data of a search range of a reference picture is stored in a search window memory. Using a gray code, the register file of the search window memory is read, candidate blocks are successively extracted, and the image data is successively input to processor elements. The data stored in the current block memory is input to a register and input through a barrel shifter to the processor elements. The processor elements find the differences of the current block and candidate blocks, find the cumulative values, compare the cumulative values of differences at a comparison unit, extract the candidate block giving the smallest value, and detect the motion vector based on the candidate block.

11 Claims, 8 Drawing Sheets

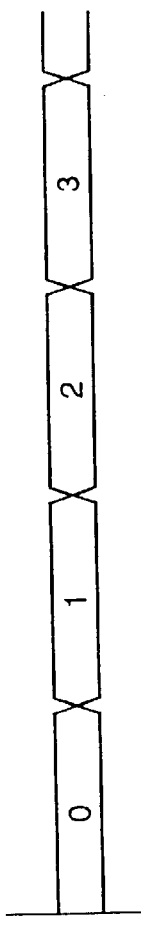
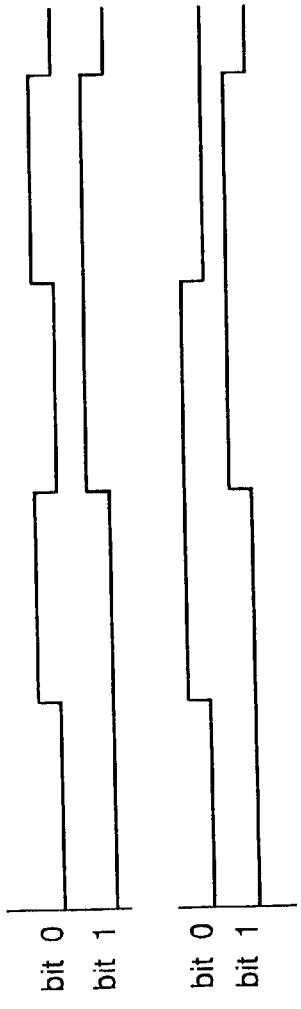
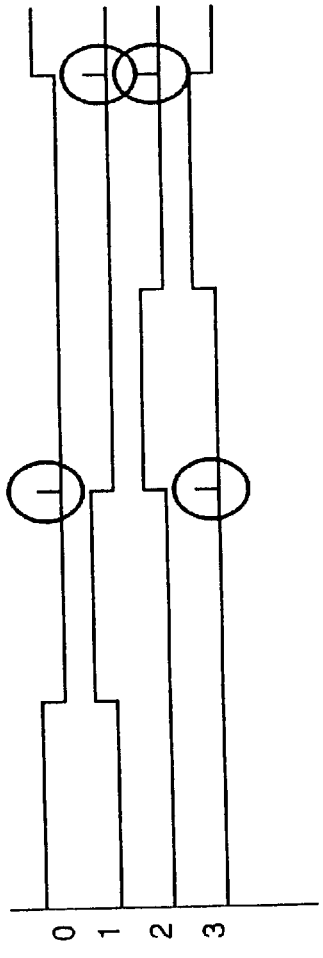
FIG. 6A  READ ADDRESS
FIG. 6B  READ ADDRESS WITH BINARY CODE SYSTEM
FIG. 6C  READ ADDRESS WITH GRAY CODE SYSTEM
FIG. 6D  OUTPUT GATE ENABLE SIGNAL

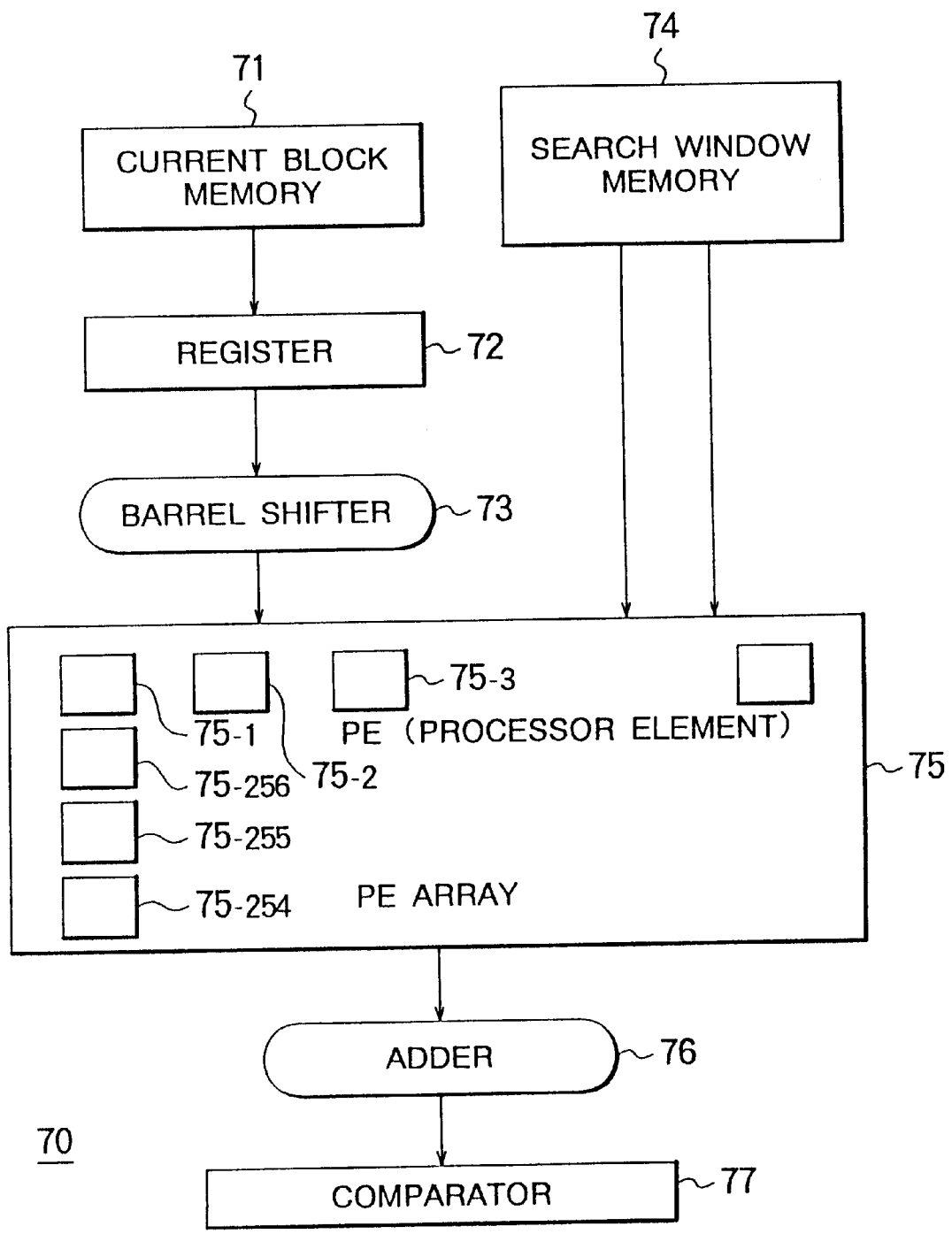

IMAGE PROCESSING APPARATUS

BACKGROUND OF THE INVENTION

1. Field of the Invention

The present invention relates to an image processing apparatus preferred for performing processing, for example, motion detection processing at the time of coding moving pictures.

2. Description of the Related Art

In recent years, there has been remarkable progress made in a coding techniques for coding moving pictures with a high quality and a high compression rate.

As one of main techniques for performing such a moving picture compression with a high efficiency, there is motion detection for finding the motion vector indicating the motion of the image. Several techniques for finding this motion vector have been proposed. As one of the main techniques, there is the technique referred to as "block matching".

An explanation will be made of this block matching by referring to FIG. 1.

In this block matching, the image covered by the motion detection (hereinafter referred to as a "current image") is divided into blocks of for example M number of pixels×N number of lines (hereinafter referred to as a "current block"), and the motion vector is found for every current block.

First, a predetermined search range is set in the vicinity of the position corresponding to the current block of the image before the usual current image for performing a comparison for motion detection in time (hereinafter referred to as a reference image). A plurality of blocks of M number of pixels×N number of lines the same as the current block (hereinafter referred to as candidate blocks) are extracted based on the candidate motion vector given from within this search range.

Next the difference between corresponding pixels of the current block and candidate block is found. Further, for example, the cumulative value of the differences of all pixels in the block is found and made the evaluation value of that candidate block.

Next, the candidate block giving the smallest evaluation value is found, and the candidate motion vector corresponding to that candidate block is used as the motion vector for the current block.

In such a motion detection method, however, the quality of the compressed and expanded image is greatly influenced by the size of the search range of the candidate block. Therefore, it is made desirable to perform high speed motion detection by using a large search range. For this reason, in an actual moving picture coding circuit, sometimes the method is adopted of using high speed blocks for the processing as much as possible and further using pipeline processing for the motion detection circuit. Further, sometimes the method is adopted of storing the image data of the search range of the reference image generating the candidate block in the register file, reading this by an FIFO format, and thereby calculating the differences from the pixels of the current block at a high speed.

Moving image coding circuits, including such motion detection circuits, are often incorporated in LSIs. It is therefore desired to reduce the power consumption.

This motion detection circuit, however, is disadvantageous in that it is difficult to reduce the power consumption to processing a large amount of data at a high speed in high speed operation.

Specifically, for example, since binary code addresses are normally used for reading a register file, when successively reading data by continuously changing the addresses, hazards occur in the output of the address decoder, output signals frequently collide on the output bus of the register file due to the hazards, and the power consumption of the register file as a whole becomes larger.

Further, when successively shifting image data by pipeline parallel processing etc., an on/off operation of the data line is repeated between the processor elements so the power consumption becomes larger due to this operation.

Further, as explained above, this motion detection circuit operates at a high speed, so the increase in the power consumption due to the collisions on the output signal and the shift of the data becomes smaller which has a large effect on the power consumption of the moving picture coding circuit as a whole.

SUMMARY OF THE INVENTION

An object of the present invention is to provide an image processing apparatus which can scan stored image data with less power consumption at a high speed for motion detection processing.

To achieve the above object, the image processing apparatus of the present invention uses a gray code value as an address when the read address continuously changes so as to avoid bus collisions and suppress any increase in the power consumption.

Further, the image data of one current block remains unchanged until finding this cumulative value of the differences for all candidate blocks for a current block, so the image data of the current block is stored in a fixed register to eliminate the operation of shifting the data. For this, a barrel shifter is used to make it possible to input image data of the current block to a plurality of processor elements of the processor element array in a state shifted to any position.

Accordingly, an image processing apparatus of the present invention is an image processing apparatus successively scanning image data to perform a predetermined processing, having a plurality of storing means each given an address, said plurality of storing means respectively storing the image data in predetermined units and successively storing continuous predetermined units of image data in storing means of addresses differing by only one bit; a plurality of output gate means provided corresponding to the plurality of storing means for outputting contents stored in the storing means only when a selection signal of the storing means is applied; an address generating means for successively generating addresses differing by one bit each at which the continuous plurality of units of image data are stored; a decoding means for decoding the generated addresses to generate a selection signal for selecting one of the plurality of storing means and applying the same to said output gate means provided in the storing means; and an image processing means for performing predetermined processing using the image data successively output via the plurality of output gate means.

Preferably, the image processing apparatus of the present invention further has an image data writing means for storing the input image data in the plurality of storing means so that the continuous plurality of units of image data are stored in the storing means having addresses differing only by one bit.

Preferably, the means are constituted on an integrated circuit; and the plurality of storing means, the plurality of output gate means constituted corresponding to the plurality of storing means, and the decoding means for applying the selection signal to the output gate means based on the addresses are constituted as a register filing means.

Preferably, each of the storing means of the plurality of storing means respectively store image data in pixel units of the image data.

More specifically, the plurality of storing means record at least image data within a predetermined motion search range of a reference image for performing motion detection; the address generating means generates addresses so that a plurality of candidate blocks of image data extracted from the stored image data within the predetermined motion search range are successively output; and the image processing means extracts a predetermined evaluation value based on a differential value of corresponding pixels between the plurality of candidate blocks of the image data successively output based on the generated addresses and the image blocks of the image data covered by the motion detection for every candidate block, extracts the candidate block corresponding to the image block of the image data covered by the motion detection based on the evaluation value, and detects a motion vector based on the extracted candidate block.

Further, the image processing apparatus of the present invention has a current image storing means for storing n number of pixel data of a current image block in a predetermined order, a barrel shifter means for causing the stored n number of pixel data to shift by a desired number and outputting the same in a shifted state from n number of outputting means, a reference image storing means for storing reference image data, a candidate image block inputting means for successively extracting a candidate image block from a predetermined search range of the reference image data and inputting the n number of image data of the candidate image block, n number of operating means provided corresponding to the n number of outputting means of the barrel shifter means and the inputs of the n number of pixel data of the candidate image block inputting means and calculating the difference of each pixel data of the current image block and candidate image block, a cumulative adding means for cumulatively adding the calculated differences of the image data for all image blocks, and an image block determining means for determining an image block for detecting a motion vector based on the cumulative value.

Preferably, each of the plurality of candidate image blocks is an image block extracted by slightly shifting the search range of the reference picture. The candidate image block inputting means successively changes part of the image data in the n number of image data to successively input a plurality of candidate image blocks. The barrel shifter means changes the amount of shift so that the corresponding pixel data is input to the same operating means with respect to a candidate image block.

Preferably, the current image block and the candidate image blocks are image blocks with n number of pixels and the n number of operating means and cumulative adding means calculate the cumulative value of difference all together for one candidate block.

Specifically, the operating means is a means for calculating the difference between a pixel value of a current image block and a pixel value of a candidate image block as explained above.

More specifically, it is a means for calculating a square value of the difference between a pixel value of a current image block and a pixel value of a candidate image block and the cumulative adding means cumulatively adds the square values of the difference.

More specifically, the reference picture storing means stores the reference picture so that the continuous pixel data is stored in addresses differing by one bit each and the candidate image block inputting means successively accesses addresses differing by one bit each to read the continuous image data of the candidate image block, obtains n number of pixel data, and inputs these through the n number of inputting means to the n number of operating means.

BRIEF DESCRIPTION OF THE DRAWINGS

These and other objects and features of the present invention will become clearer from the following description of the preferred embodiments given with reference to the attached figures, wherein:

FIG. 6A to FIG. 6D are views of waveforms of an address signal when reading pixel data stored in a cell unit array of a search window memory shown in FIG. 4, in which FIG. 6A is a view of a read address; FIG. 6B is a view of the address by a binary code developed for every bit; FIG. 6C is a view of the address by a gray code developed for every bit; and FIG. 6D is a view of an output gate enable signal obtained by decoding the address by the binary code;

FIG. 7 is a block diagram of the configuration of a motion detection apparatus of a second embodiment of the present invention.

DESCRIPTION OF THE PREFERRED EMBODIMENTS

Next, embodiments of the present invention will be explained in further detail using the drawings.

Figure 2:
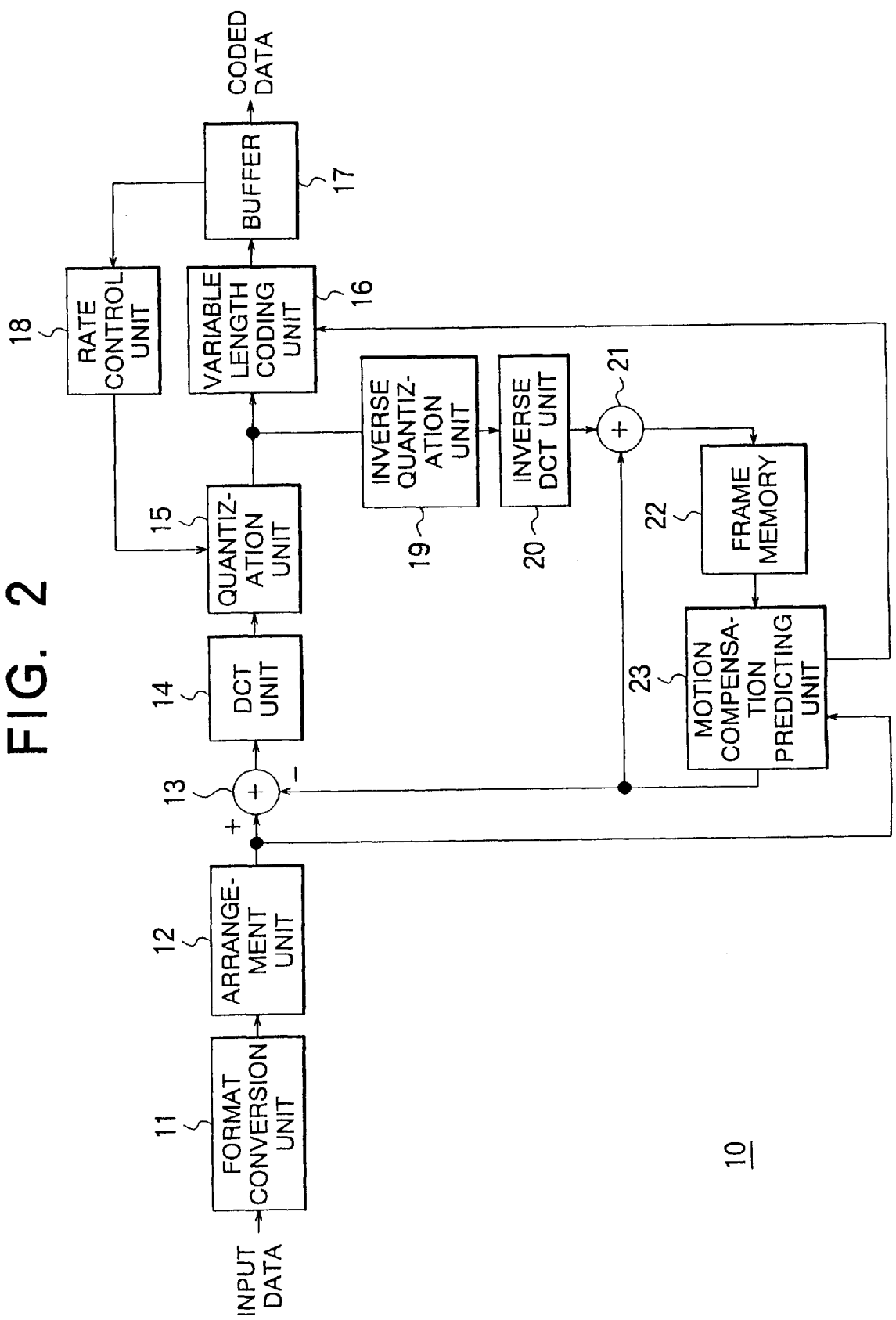
FIG. 2 is a block diagram of the configuration of a moving picture coding device preferred for use for an image processing apparatus of the present invention.

FIG. 2 is a block diagram of the configuration of the moving picture coding device suitable for use of an image processing apparatus of the present invention.

This moving picture coding device 10 is a device for compressing and coding digital video data input by the MPEG2 system (high quality moving picture coding system by Moving Picture Coding Experts Group).

The moving picture coding device 10 has a format conversion unit 11, a rearrangement unit 12, an adder 13, a DCT unit 14, a quantization unit 15, a variable length coding unit 16, a buffer 17, a rate control unit 18, an inverse quantization unit 19, an inverse DCT unit 20, an adder 21, a frame memory 22, and a motion compensation prediction unit 23.

In this moving picture coding device 10, the input digital video data is first converted to a spatial resolution used for the coding in the format conversion unit 11. Further, in a B (bidirectionally predictive coded) picture, the coding is carried out by using the pictures before and after it in time, therefore the rearrangement of pictures is carried out in the rearrangement unit 12 in accordance with the picture type (I (intra coded) picture, P (predictive coded) picture, and B picture).

Next, the input pictures are coded in macro block units of 8 pixels×8 lines. First, where the coding mode of the macro block is the motion compensation prediction mode, in the adder 13, the difference of the macro block image data obtained from the reference picture by the motion prediction is obtained and a predictive error signal is generated.

This predictive error signal is DCT-coded at the DCT unit 14.

The obtained DCT coding coefficient is quantized at a quantization unit 15 in accordance with a target bit and visual properties, successively scanned from a low frequency component, and converted to one-dimensional information.

Then, it is subjected to variable length coding at the variable length coding unit 16 together with the motion vector and coding mode information, accumulated in the buffer 17, and then output as an MPEG video bit stream.

Further, where the coded picture is an I picture or a P picture, it is necessary to use the same later as the reference picture of the motion compensation prediction, therefore the quantized information is inversely quantized at the inverse quantization unit 19, subjected to inverse DCT at the inverse DCT unit 20, and further subjected to the motion compensation by the adder 21 for local decoding, restored to the same image as that of the decoding device, and accumulated in the frame memory 22.

Based on the image data accumulated in this frame memory 22, the motion compensation prediction is carried out with respect to the input image data at the motion compensation prediction unit 23. The result is output to the adder 13 as the reference signal for finding the predictive error.

Note that the amount of codes generated by the variable length coding unit 16 becomes variable, therefore where the coded data is given the fixed bit rate, the rate control unit 18 supervises the buffer 17 and grasps the amount of bits, and performs the quantization control in accordance with the target bit rate.

In such a moving picture coding device 10, the image processing apparatus of the present invention is for example used for the detection of the motion vector in the motion compensation prediction unit 23.

An explanation will be made of the motion detection device of a first embodiment of the present invention by referring to FIG. 3 to FIG. 6.

Figure 3:
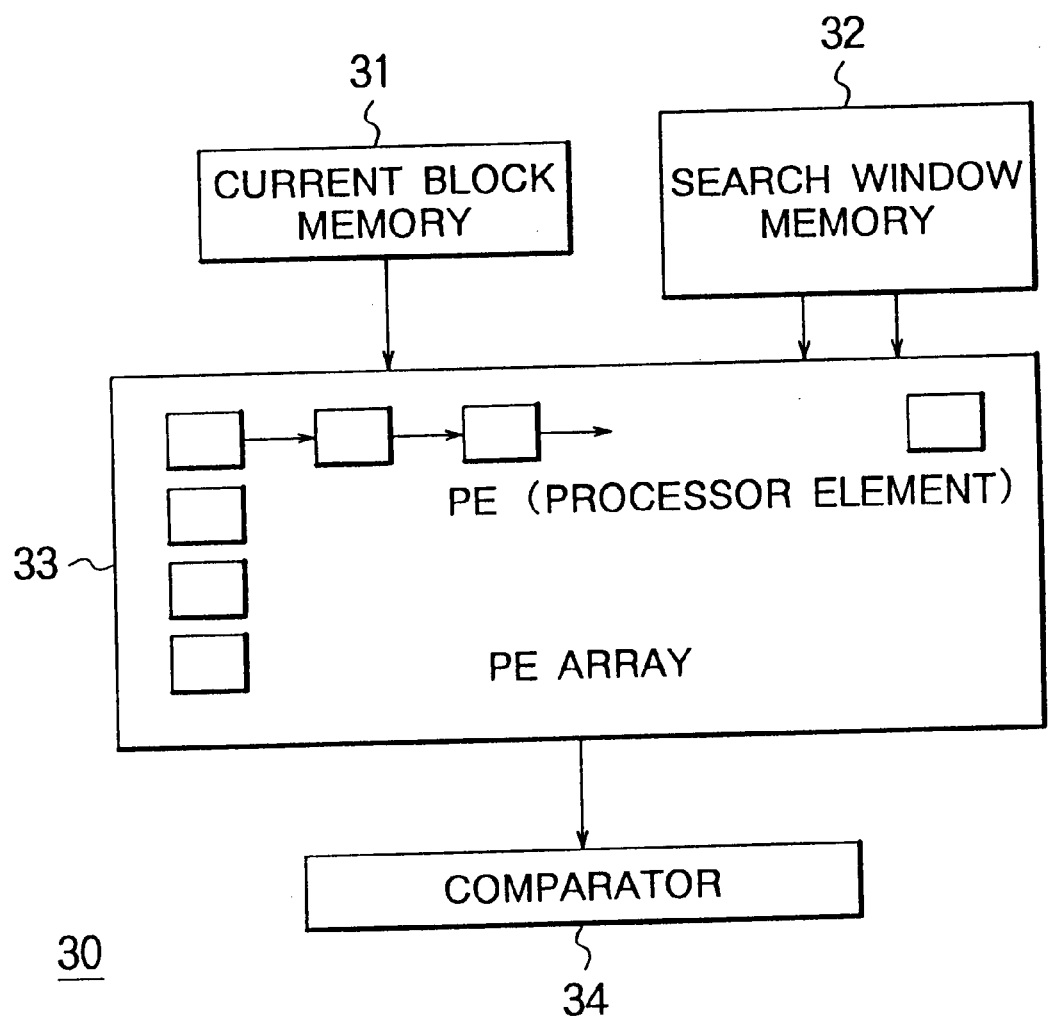
FIG. 3 is a block diagram of the configuration of a motion detection device of an embodiment of the present invention.

FIG. 3 is a block diagram of the configuration of the motion detection device 30.

The motion detection device 30 has a current block memory 31, a search window memory 32, a processor element array 33, and a comparison unit 34.

First, an explanation will be made of the configuration and function of the units of this motion detection device 30.

The current block memory 31 is a memory to which the current blocks covered by the motion vector detection obtained by dividing the current image data into blocks of 16 pixels×16 lines are successively input.

Figure 1:
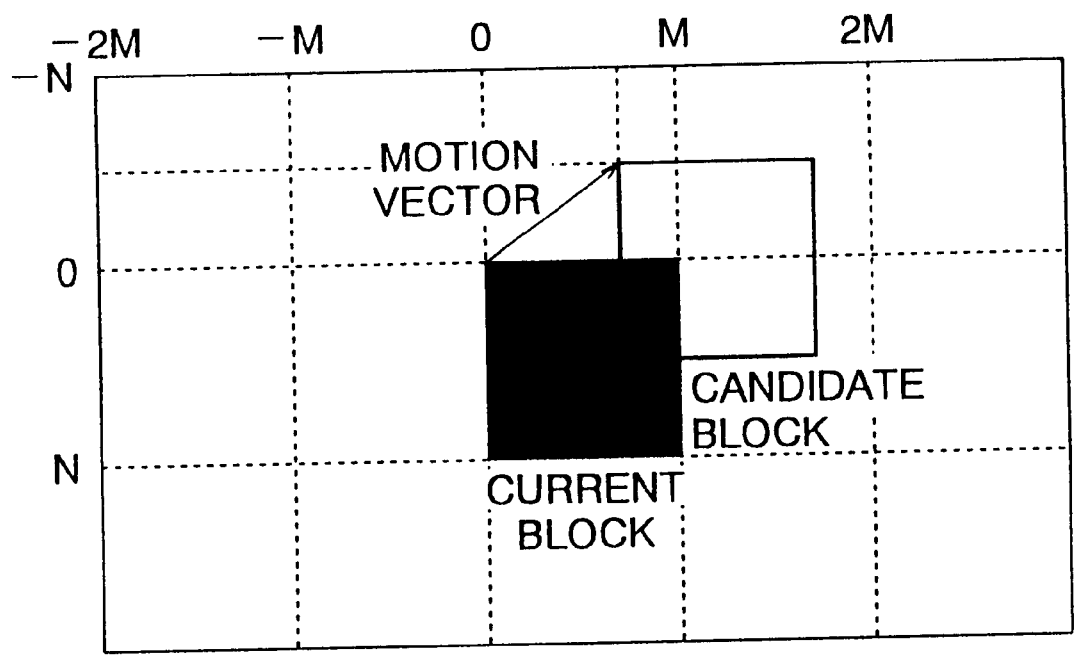
FIG. 1 is a view for explaining a current block, a motion vector search range, and a candidate block.

The search window memory 32 is a register file for recording the image data of the predetermined search range in the vicinity of the current block of the image one frame before the current image in time. In the present embodiment, this search range is a range of ±32 pixels in the horizontal direction of the current block and ±16 lines in the vertical direction. Namely, the reference image data of the range as shown in FIG. 1 when N=M=16 is stored in the search window memory 32.

An explanation will be made of the detailed configuration of this search window memory 32 by referring to FIG. 4.

Figure 4:
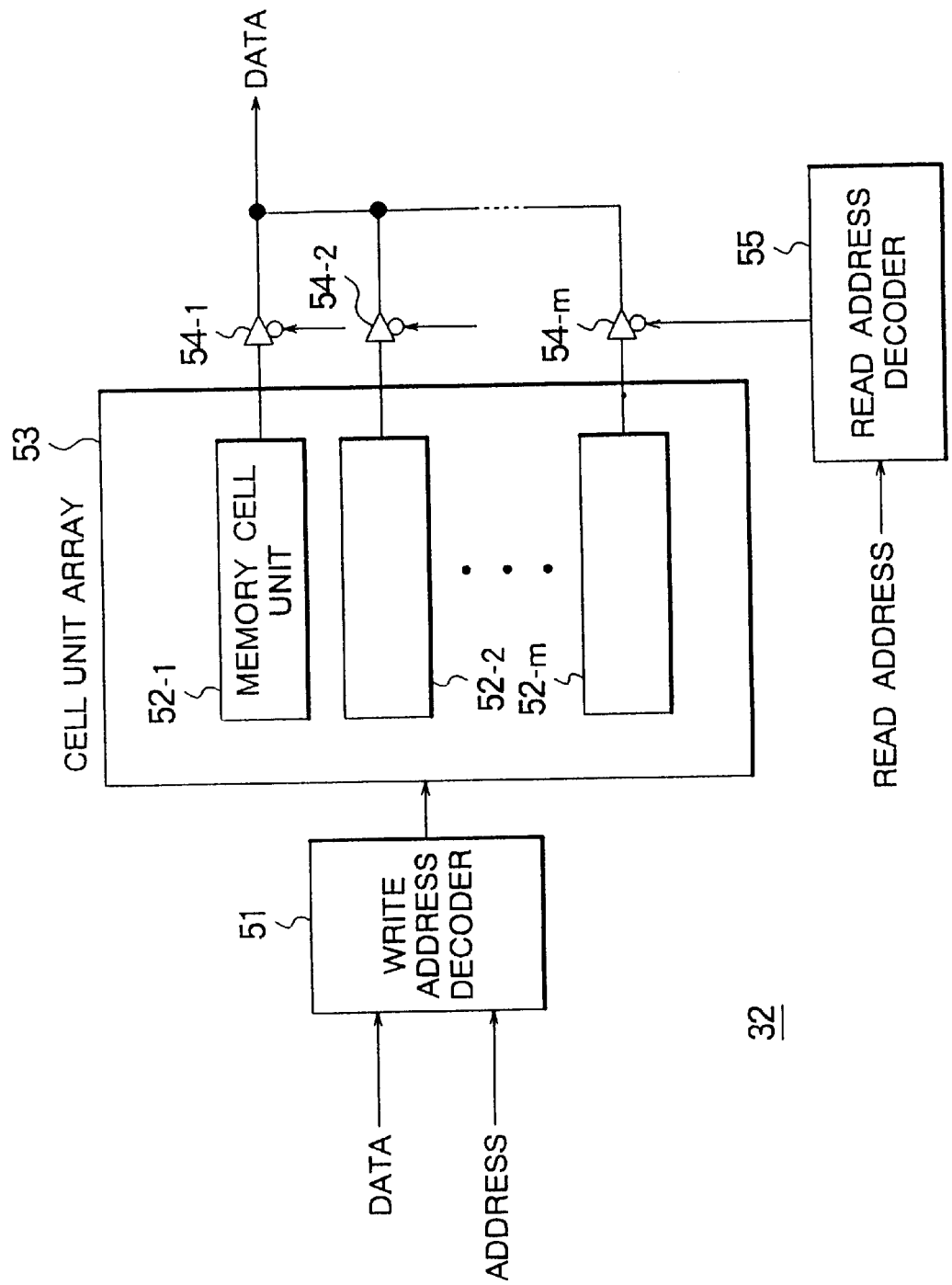
FIG. 4 is a block diagram of the configuration of a search window memory of the motion detection device shown in FIG. 3.

FIG. 4 is a block diagram of the configuration of the search window memory 32. The search window memory 32 has a write address decoder 51, a cell unit array 53 having m number of memory cell units $52_{-1}$ to $52_{-m}$, m number of output gates $54_{-1}$ to $54_{-m}$ provided at the output units corresponding to m number of memory cell units $52_{-1}$ to $52_{-m}$, and a read address decoder 55.

In this search window memory 32, addresses are given to m number of memory cell units $52_{-1}$ to $52_{-m}$ by a gray code. Namely, in order from the physically top position, addresses that differ by only one bit between adjoining memory cell units, for example, 0000b (=0), 0001b (=1), 0011b (=2), 0010b (=3), 0110b (=4), 0111b (=5), 0101b (=6), 0100b (=7), 1100b (=8), . . . are given. Note that, the b indicates binary notation.

Then, in the write address decoder 51, the write addresses input by these gray code addresses are decoded, the selection signal and write enable signal are output to the memory cell unit 52-i (i=1 to m) indicated by the address, and the input data is written into the memory cell unit 52-i.

Further, in the read address decoder 55, the read address similarly input by the same gray code address is decoded, and an output enable signal for making the output on is output to the output gate 54 provided corresponding to the memory cell unit 52-j (j=1 to m) indicated by that address.

Further, with respect to this search window memory 32, the address signal and the control signal are input from a not illustrated control unit of the motion detection device for control. By this, the image data of the search range of the reference image is successively recorded in the cell unit array 53 via the write address decoder 51. Further, the candidate block is appropriately extracted from the recorded image data, the read address signal indicating the image data of the candidate block is input to the read address decoder 55, and the pixel data of the candidate block is successively output from the search window memory 32.

Note that as the image data of the candidate block, all of the blocks of 16 pixels×16 lines the same as the current block which can be extracted from the image data recorded in the cell unit array 53 are extracted and successively output. Namely, first, the candidate blocks of 16 pixels×16 lines are successively extracted shifted by one pixel each from the top left position of the image of the search range. When the block of the right top is extracted, the candidate blocks are next similarly successively extracted from the left direction to the right direction shifting the range in a direction one line down.

The processor element array 33 finds the difference between corresponding pixels of the pixel data of the current block input from the current block memory 91 and appropriately shifted between the processor elements $33_{-1}$ to $33_{-n}$ and the pixel data of the candidate blocks input from the search window memory 32 at the processor elements $33_{-i}$ (i=1 to n). Then, the found difference is successively propagated and accumulated for the processor elements $33_{-1}$ to $33_{-n}$, whereby the cumulative error value with respect to the candidate blocks is finally found and output to the comparison unit 34.

Figure 5:
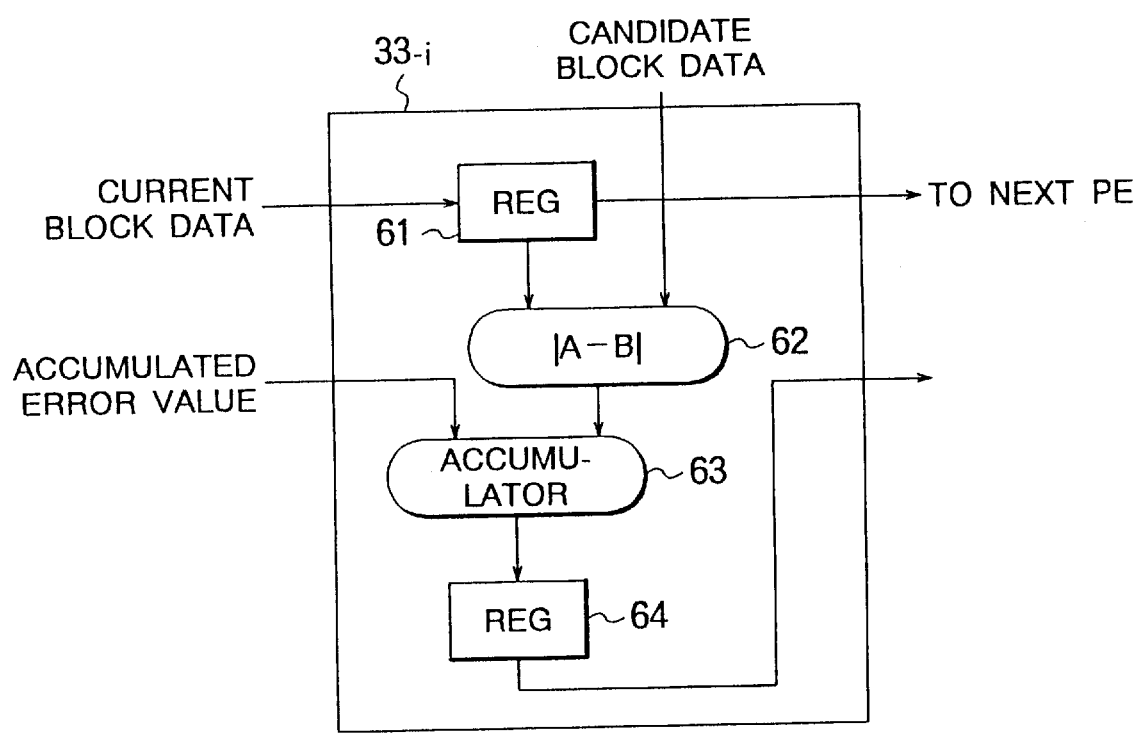
FIG. 5 is a block diagram of the configuration of a processor element of the motion detection device shown in FIG. 3.

The detailed configuration of the processor element array $33_{-i}$ (i=1 to n) is shown in FIG. 5.

The processor element array $33_{-i}$ has a first register 61 for storing the current block data, a difference calculation circuit 62 for calculating the difference between the current block data stored in the first register 61 and the input candidate block data, an operation unit 62 for adding the difference calculated at the difference calculation circuit 62 and a cumulative value of difference (cumulative error value) calculated at the former processor element array $33_{-i-1}$ and a second register 64 for storing the cumulative error value calculated at the operation unit 63.

Then, the output of the processor element $33_{-i}$ is successively input to the next processor element $33_{-i+1}$. By this, basically the cumulative value of the differences of all pixels between the current block data and candidate block data is obtained.

Further, also the output of the first register 61 is successively input to the next processor elements $33_{-i+1}$. A shift register is substantially constituted by n number of processor elements $33_{-1}$ to $33_{-n}$. By successively shifting the current image data from one processor element to another processor element in accordance with the input candidate block data, operations can be carried out between corresponding pixels in the candidate blocks.

The comparison unit 34 compares the cumulative values of difference successively found with respect to the candidate blocks in the processor element array 33, detects the minimum value thereof, and extracts the candidate block at that time.

Then, the (not illustrated) control unit in the motion detection device 30 detects the candidate vector based on the candidate block giving the smallest cumulative value of difference extracted in the comparison unit 34 and outputs the same to the variable length coding unit 16 etc. of the moving picture coding device 10.

Such a motion detection device 30 stores the current image data in the current block memory 31 and stores the image data within the search range of the reference image in the search window memory 32. The pixel data of current blocks and candidate blocks stored in these current block memory 31 and the search window memory 32 are input to the processor elements (PE) $33_{-1}$ to $33_{-n}$ in the processor element array 33. These processor elements $33_{-1}$ to $33_{-n}$ perform pipeline processing to find the cumulative value of the difference of the current blocks and candidate blocks of the whole processor array 33. Then, the cumulative value of difference obtained from a plurality of candidate blocks are compared at the comparison unit 34, the candidate block giving the smallest value is extracted, and a motion vector is detected based on this candidate block.

Then, particularly, the search window memory 32 successively reads the image data according to the read address signal generated at the control unit of the motion detection device 30 and successively outputs it to the processor element array 33, but at this time, since the gray code is used, no hazard at all occurs in the read address. No collisions on the bus occur due to the m number of memory cell units $52_{-1}$ to $52_{-m}$ in the search window memory 32 either.

This will be explained by referring to FIGS. 6A to 6D.

FIGS. 6A to 6D are views of waveforms of the address signal when reading the pixel data stored in the cell unit array 923, in which FIG. 6A is a view of the read address; FIG. 6B is a view of the address by the binary code developed for every bit; FIG. 6C is a view of the address by the gray code developed for every bit; and FIG. 6D is a view of the output gate enable signal obtained by decoding the address by the binary code.

As shown in FIG. 6A, where the read address changes as 0, 1, 2, . . . , if this address has been input by the binary code, the signal of each bit of this address changes as shown in FIG. 6B. Namely, there arises a case where two or more signal lines simultaneously change. As a result, a hazard as shown in FIG. 6D occurs in the output enable signal as the result of decoding, and a collision of the bus occurs at this time.

On the other hand, where this read address has been input by a gray code address, the number of signal lines which change is always one as shown in FIG. 6C. As a result, no hazard as shown in FIG. 6D is generated, and also no bus collision occurs.

Note that, in such a case, the power consumption is generally shown as in Equation (1). In the present embodiment, this means that the term $\Sigma(dQ/dt)$ can be made 0.

$$P = P_{CK} + P_D + P_{DC} + \Sigma(dQ/dt)V \tag{1}$$

where, $P_{CK}$ is a clock line power consumption;

$P_D$ is a data line power consumption;

$P_{DC}$ is a power consumption by a DC through current; and $\Sigma(dQ/dt)$ is a power consumption by dynamic hazard.

In this way, the motion detection device 30 of the first embodiment, when continuously reading data from the register file, adopts a gray code address as a reading address, therefore can reduce the number of times of on/off operation of the buffer with respect to the output bus of the register file and thus can reduce the power consumption.

As a result, for example in a case where MPEG encoding is built into an LSI, an image processing device preferred for a case where a particularly high speed FIFO is required can be provided.

Note that the first embodiment can be modified in various ways.

For example, the search window memory 32 of the motion detection device 30 of the present embodiment adopts a gray code address for both of the write address decoder 51 when writing data with respect to the cell unit array 53 and the read address decoder 55 when reading the data. However, it is also possible to adopt a configuration wherein this is used only in the read address decoder 55. Namely, the write address decoder 51 may be perform the access by the usually binary code. Note, in that case, two addressings of the write address and read address will be carried out with respect to each memory cell unit 52 of the cell unit array 53. However, such a configuration is possible when it is desired to use a binary code.

Further, in the present embodiment, the current block memory 31 and the search window memory 32 were configured as if they were different image memories, but it is also possible to constitute them by substantially the same memory means.

Further, in the present embodiment, one block is selected from among a plurality of candidate blocks by using the total value of all pixels of differences of the pixel data as the evaluation value of the candidate block, but for example it is also possible to find the square value of difference for every pixel, add them up for all pixels, and use the same as the evaluation value of the candidate block. In that case, the operation unit 33 of each processor element of the processor element array 63 will perform a square operation. Of course, the configuration of each processor element may be such a configuration too and is not limited to the configuration of the present embodiment shown in FIG. 5.

According to the image processing apparatus of the present invention as explained with reference to the motion detection device of the first embodiment, when image data is successively scanned by using a register file, the power consumption of the same can be reduced.

Next, a motion detection device of a second embodiment of the present invention will be explained with reference to FIG. 7 and FIG. 8.

The motion detection device 30 of the first embodiment used a gray code for addresses at the time of scanning the image so as to avoid bus collisions and prevent an increase of the power consumption. Since the on/off operation of the data line by successively shifting the current blocks of the image data is continuously repeated, an increase of the power consumption is not prevented.

In the second embodiment, an explanation is made of a motion detection device which is able to prevent a repetition of the on/off operation of the data line.

FIG. 7 is a block diagram of the configuration of this motion detection device 70.

The motion detection device 70 has a current block memory 71, a register 72, a barrel shifter 73, a search window memory 74, a processor element array 75, an addition unit 76, and a comparison unit 77.

First, the configuration and functions of the units of the motion detection device 70 will be explained.

The current block memory 71 is a memory to which the current blocks covered by the motion vector detection obtained by dividing the current image data into blocks of 16 pixels×16 lines are successively input.

The register 72 is a register for storing the current block. In the present embodiment, the each piece of the image data of the image data is 8-bit data. Therefore, the register 72 has the capacity of 8 bits×256 words. Further, each word of the register 72 is configured to be output in parallel to the later mentioned barrel shifter 73.

The barrel shifter 73 causes the data input from the 256 input terminals to be shifted by exactly the predetermined number of shifts input and outputs the same from the 256 output terminals. The number of shifts is instructed by a control signal input from a not shown control unit of the motion detection device 70. Further, the 256 pieces of data output are output to the processor elements of the processor element array 75.

The search window memory 74 is a register file for recording the image data of the predetermined search range in the vicinity of the current block of the image one frame before the current image in time. In the present embodiment, this search range is a range of ±32 pixels in the horizontal direction of the current block and ±16 lines in the vertical direction. Namely, the reference image data of the range as shown in FIG. 1 when N=M=16 is stored in the search window memory 74.

Further, a data read address is input from a not shown control unit of the motion detection device 70 to the search window memory 74 and the data read out through the address decoder in the search window memory 74. As this read data, all of the 16 pixel×16 line blocks the same as the current block able to be extracted from the image data recorded in the search window memory 74 are successively output. Namely, first, the candidate blocks of 16 pixels×16 lines are successively extracted shifted by one pixel each from the top left position of the image of the search range. When the block of the right top is extracted, the candidate blocks are next similarly successively extracted from the left direction to the right direction shifting the range in a direction one line down.

The 256 pieces of data of the designated candidate block are output in parallel from the search window memory 74 and output to the processor elements of the processor element array 75.

The processor element array 75 finds the difference between corresponding pixels of the pixel data of the current block input from the current block memory 73 and the pixel data of the candidate blocks input from the search window memory 74 and output to the addition units 76.

The processor element array 75 has 256 processor elements $75_{-1}$ to $75_{-256}$ connected so as to receive as input data from one output terminal of each of the barrel shifters 73 and one output terminal of the search window memory 74 and finds the difference between corresponding pixels at the processor elements $75_{-i}$ (i=1 to 256).

Figure 8:
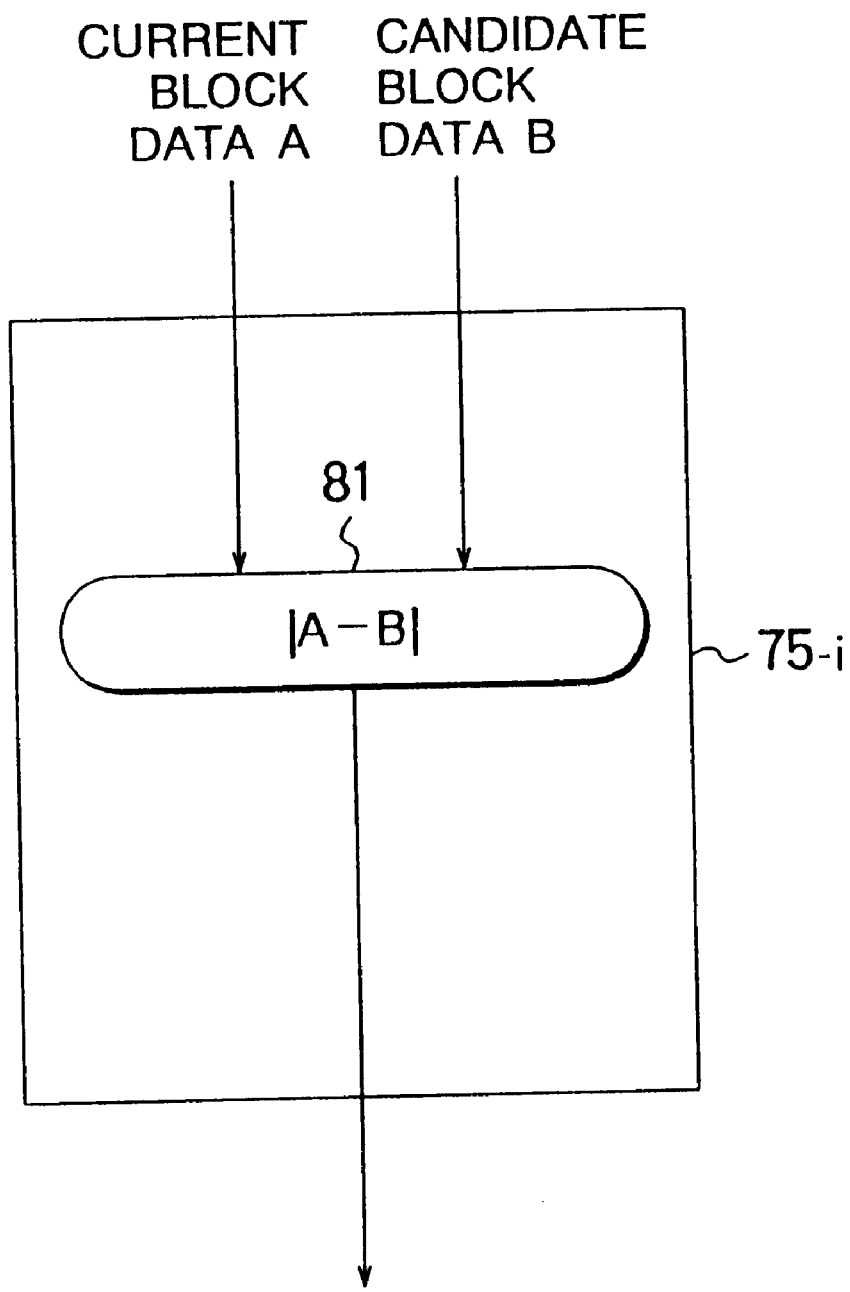
FIG. 8 is a block diagram of the configuration of a processor element of a motion detection apparatus shown in FIG. 7.

The processor elements 75-i (i=1 to 256), as shown in FIG. 8, is configured to have only an operation unit 81 for obtaining the difference of two input pixel data.

The addition unit 76 calculates the total of the differences of the pixels output from the 256 processor elements $75_{-1}$ to $75_{-256}$ of the processor element array 75 and outputs the same to the comparison unit 77.

The comparison unit 77 successively compares the cumulative values of difference successively calculated for each candidate block at the processor element array 75 and addition unit 76, detects the smallest value, and extracts the candidate block at that time.

The (not shown) control unit of the motion detection device 70 detects the candidate vector based on the candidate block giving the smallest cumulative value of difference extracted by the comparison unit 77 and outputs the same to a variable length coding unit 16 of the afore-mentioned moving picture coding apparatus 10.

Next, an explanation will be made of the operation of the motion detection device 70.

First, the current block covered by the motion detection and the image data in a search range of the reference image determined based on the current block are recorded in the current block memory 71 and search window memory 74.

First, a first candidate block is extracted from the image data recorded in the search window memory 74. The 256 pieces of image data are input to the 256 processor elements $75_{-1}$ to $75_{-256}$ of the processor element array.

On the other hand, the data of the current block recorded in the current block memory 71 is input to the register 72 and input through the barrel shifter 73 to the 256 processor elements $75_{-1}$ to $75_{-256}$ of the processor element array 75. At this time, the barrel shifter 73 causes shifting so that the pixels of the current block to be input to the same processor element $75_{-I}$ (I=1 to 256) as the corresponding element of the candidate block.

In this state, the processor elements $75_{-1}$ to $75_{-256}$ calculate the difference between pixels, calculate the totals at the addition unit 76, and store the result in the comparison unit 77.

Next, the next candidate block is processed. The image data input from the search window memory 74 is shifted by one line's worth of image data from the previous candidate block and becomes the new image data. The remaining 15 lines worth of image data is the same as the image data of the previous candidate block. Therefore, the search window memory 74 changes the one line's worth of 16 pixels worth of data and inputs the image data of the candidate block to the processor elements 75. At this time, the amount of shift of the barrel shifter for the current pixel is changed and the corresponding pixel of the current block is input to the same processor element $75_{-I}$ for each pixel data of the new candidate block.

Once the corresponding pixel data is input to each of the processor elements 75, the processor elements 75$_{-1}$ to 75$_{-256}$ calculate the difference between the pixels, calculate the totals at the addition unit 76, and compare the cumulative value of difference already stored with the totals in the comparison unit 77 so as to detect the minimum cumulative value of difference.

In this way, once the cumulative value of difference is detected for all of the candidate blocks, the candidate vector for the current block is determined based on the candidate block giving the smallest cumulative value of difference recorded in the comparison unit 77 at that time.

In this way, the motion detection device 70 of the second embodiment uses the barrel shifter to replace the shift register. That is, it becomes possible to input the desired data into the desired processor element by just simple switching control and therefore a data shift operation becomes unnecessary in practice. Therefore, it is possible to reduce the power consumption of the motion detection device 70.

Further, the configuration of the processor elements of the processor element array 75 may be made extremely simpler.

As a result, for example, it is possible to provide a motion detection device preferred for placing an MPEG encoder such as the moving picture coding apparatus 10 shown in FIG. 2 on an LSI.

Note that the second embodiment may be modified in various ways as well. For example, in the present embodiment, the current block memory 71 and search window memory 74 is configured by separate image memories, but they may be configured by the same memory means as well.

Further, in the present embodiment, one block is selected from among a plurality of candidate blocks by using the total value of all pixels of differences of the pixel data as the evaluation value of the candidate block, but for example it is also possible to find the square value of difference for every pixel, add them up for all pixels, and use the same as the evaluation value of the candidate block. In that case, the processor elements 75$_{-I}$ (I=1 to 256) of the processor element array 75 are configured with squaring devices. Of course, the configuration of each processor element may be such a configuration too and is not limited to the configuration of the present embodiment shown in FIG. 8.

Further, while the 256 pixels of a block were summed up in parallel to find the difference in the present embodiment, the method may also be adopted of performing processing for successively finding the difference for each 8 pixels, 16 pixels, and 64 pixels and successively totaling the same The configuration of the inside of the addition unit 76 and comparison unit 77 may be any configuration as well.

As explained above with reference to the motion detection device of the second embodiment, according to the image processing apparatus of the present invention, it is possible to provide a motion detection device of a simple circuit configuration and, as a result, to realize an image coding apparatus more suited for LSIs.

What is claimed is:

1. An image processing apparatus successively scanning image data to perform predetermined processing, said image processing having:

a plurality of storing means each given an address, said plurality of storing means respectively storing the image data in predetermined units and successively storing continuous predetermined units of image data in said storing means of addresses differing by only one bit;

a plurality of output gate means provided corresponding to the plurality of storing means for outputting contents stored in the storing means only when a selection signal of the storing means is applied;

an address generating means for successively generating addresses differing by one bit each at which the continuous plurality of units of image data are stored;

a decoding means for decoding the generated addresses to generate a selection signal for selecting one of the plurality of storing means and applying said selection signal to said output gate means provided in the storing means; and an image processing means for performing predetermined processing using the image data successively output via the plurality of output gate means.

2. An image processing apparatus as set forth in claim 1, further having an image data writing means for storing the input image data in the plurality of storing means so that the continuous plurality of units of image data are stored in the storing means having addresses differing only by one bit.

3. An image processing apparatus as set forth in claim 2, wherein:

the means are constituted on an integrated circuit; and the plurality of storing means, the plurality of output gate means constituted corresponding to the plurality of storing means, and the decoding means for applying the selection signal to the output gate means based on the addresses are constituted as a register filing means.

4. An image processing apparatus as set forth in claim 3, wherein each of the storing means of the plurality of storing means respectively store image data in pixel units of the image data.

5. An image processing apparatus as set forth in claim 4, wherein:

the plurality of storing means record at least image data within a predetermined motion search range of a reference image for performing motion detection;

the address generating means generates addresses so that a plurality of candidate blocks of image data extracted from the stored image data within the predetermined motion search range are successively output; and the image processing means extracts a predetermined evaluation value based on a differential value of corresponding pixels between the plurality of candidate blocks of the image data successively output based on the generated addresses and the image blocks of the image data covered by the motion detection for every candidate block, extracts the candidate block corresponding to the image block of the image data covered by the motion detection based on the evaluation value, and detects a motion vector based on the extracted candidate block.

6. An image processing apparatus which compares a current image block obtained by dividing the pixels covered by motion detection and each of a plurality of candidate image blocks extracted from a predetermined range of a reference picture, detects an image block corresponding to the current image block, and detects a motion vector based on the image block, comprising:

a current image storing means for storing n number pixel data of a current image block in a predetermined order, a shifter means for causing the stored n number of pixel data to shift by a desired number and outputting n number of pixel data in a shifted state from n number of outputting means, a candidate image block inputting means for successively extracting a candidate image block from the stored image data of the reference picture and inputting the n number of image data of the candidate image block through an number of inputting means, n number of operating means provided corresponding to the n number of outputting means of the shifter means and the n number of inputting means and calculating a predetermined evaluation value showing a difference of said pixel data based on one pixel data of the current image block and one pixel data of the candidate image block, a cumulative adding means for cumulatively adding the calculated evaluation values for each image data for all pixels of the image block to calculate the evaluation value for the candidate image block, and an image block determining means for determining an image block for detecting a motion vector based on the calculated evaluation value for the candidate image block.

7. An image processing apparatus as set forth in claim 6, wherein each of the plurality of candidate image blocks is an image block extracted by slightly shifting the range covered so that close candidate image blocks have mutually common pixels from pixels in said predetermined range of said reference picture, the candidate image block inputting means successively changes part of the image data in the n number of image data to successively input a plurality of candidate image blocks, and the shifter means changes the amount of shift with respect to the successively input candidate image blocks so that the corresponding pixel data of said candidate image block and said current image block are input to the same operating means.

8. An image processing apparatus as set forth in claim 7, wherein the current image block and the candidate image blocks are image blocks with n number of pixels, the current image storing means stores all pixel data of said current image block, said shifter means causes all pixel data of the current image block to shift by a predetermined number and outputs said pixel data from said n number of outputting means, said candidate image block inputting means inputs all pixel data of said candidate image block through said n number of inputting means, n number of said operating means are provided corresponding to all pixels of the image blocks and calculate all together the predetermined evaluation values showing the difference between pixels for all pixels of the image blocks, said cumulative adding means cumulatively adds all together the evaluation values for all pixels of the image block calculated all together.

9. An image processing apparatus as set forth in claim 8, wherein each of said n number of operating means calculates the difference between a pixel value of an input current image block and a pixel value of a candidate image block as an evaluation value showing the difference of said image data and said cumulative adding means cumulative adds the calculated differences of the pixel values for all pixels of the image block to calculate an evaluation value for the candidate image block.

10. An image processing apparatus as set forth in claim 9, wherein each of said n number of operating means squares the difference between a pixel value of a current image block and a pixel value of a candidate image block to calculate an evaluation value showing a difference of the image data and the cumulative adding means cumulatively adds the square values of the difference of the pixel values calculated to calculate the evaluation value for the candidate image block.

11. An image processing apparatus as set forth in claim 10, wherein the reference picture storing means stores the reference picture so that the continuous pixel data is stored in addresses differing by one bit each and the candidate image block inputting means successively accesses addresses differing by one bit each to read the continuous image data of the candidate image block, obtains n number of pixel data, and inputs these through the n number of inputting means to the n number of operating means.

* * * * *